(12) United States Patent
Li et al.

(10) Patent No.: US 12,243,325 B2
(45) Date of Patent: Mar. 4, 2025

(54) SELF-CALIBRATION FOR DECORATION BASED SENSOR FUSION METHOD

(71) Applicant: Toyota Research Institute, Inc., Los Altos, CA (US)

(72) Inventors: Jie Li, Ann Arbor, MI (US); Vitor Guizilini, Santa Clara, CA (US); Adrien Gaidon, San Jose, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 323 days.

(21) Appl. No.: 17/733,101

(22) Filed: Apr. 29, 2022

(65) Prior Publication Data

US 2023/0351768 A1    Nov. 2, 2023

(51) Int. Cl.
*G06V 20/58* (2022.01)
*G06T 7/50* (2017.01)
*G06T 7/80* (2017.01)

(52) U.S. Cl.
CPC ............... *G06V 20/58* (2022.01); *G06T 7/50* (2017.01); *G06T 7/80* (2017.01)

(58) Field of Classification Search
CPC ......... G06T 3/14–153; G06T 7/50–596; G06T 7/80–85
See application file for complete search history.

(56) References Cited

U.S. PATENT DOCUMENTS

| | | | |
|---|---|---|---|
| 10,916,035 B1* | 2/2021 | Kroeger | G05D 1/0212 |
| 10,999,511 B2* | 5/2021 | Yang | G01S 17/86 |
| 11,555,903 B1* | 1/2023 | Kroeger | G05D 1/024 |
| 2018/0046649 A1 | 2/2018 | Mutto et al. | |
| 2018/0203445 A1 | 7/2018 | Micks et al. | |
| 2019/0205310 A1 | 7/2019 | Satkunarajah et al. | |
| 2020/0109954 A1 | 4/2020 | Li et al. | |
| 2020/0151512 A1 | 5/2020 | Corral-Soto et al. | |
| 2020/0174130 A1* | 6/2020 | Banerjee | B60R 11/04 |
| 2020/0282929 A1* | 9/2020 | Kroeger | G01S 7/497 |
| 2021/0073345 A1 | 3/2021 | St. Romain, II et al. | |

(Continued)

FOREIGN PATENT DOCUMENTS

| | | |
|---|---|---|
| CN | 104392387 A | 3/2015 |
| CN | 111928862 A | 11/2020 |
| CN | 112396664 A | 2/2021 |

OTHER PUBLICATIONS

Lv et al LCCnet Lidar and camera self-Calibration using Cost volume networkâ CVRP 2021 (Year: 2021).*

(Continued)

*Primary Examiner* — Sean T Motsinger
(74) *Attorney, Agent, or Firm* — Dinsmore & Shohl LLP (57) ABSTRACT

A method for self-calibrating alignment between image data and point cloud data utilizing a machine learning model includes receiving, with an electronic control unit, image data from a vision sensor and point cloud data from a depth sensor, implementing, with the electronic control unit, a machine learning model trained to: align the point cloud data and the image data based on a current calibration, detect a difference in alignment of the point cloud data and the image data, adjust the current calibration based on the difference in alignment, and output a calibrated embedding feature map based on adjustments to the current calibration.

20 Claims, 4 Drawing Sheets

(56) References Cited

U.S. PATENT DOCUMENTS

2021/0082148 A1* 3/2021 Parkison .................. G01S 7/40
2021/0158618 A1   5/2021 Bell et al.
2021/0304496 A1* 9/2021 Moon ..................... G06F 18/22

OTHER PUBLICATIONS

Schneider et al RegNet: Multimodal Sensor Registration Using Deep Neural Networksâ arXiv Jul. 11, 2017 (Year: 2017).*
Liu et al., MDPI Journal Article, Deep learning on point clouds and its application: a survey (https://www.researchgate.net/publication/336091296_Deep_Learning_on_Point_Clouds_and_Its_Application_A_Survey), 22 pgs., Sep. 1, 2019.
Wang, Yan et al. "Pseudo-LiDAR from Visual Depth Estimation: Bridging the Gap in 3D Object Detection for Autonomous Driving"—https://arxiv.org/pdf/1812.07179.pdf, 2020.
You, Yurong et al. "Pseudo-LiDAR++: Accurate Depth for 3D Object Detection in Autonomous Driving"—https://arxiv.org/abs/1906.06310, 2020.

* cited by examiner

SELF-CALIBRATION FOR DECORATION BASED SENSOR FUSION METHOD

TECHNICAL FIELD

The present specification relates to systems and methods providing a machine learning model to self-calibrate alignment between image sensor data and depth sensor data.

BACKGROUND

Image sensors, such as RGB cameras, and depth sensors, such as LiDAR sensors, are important sensor modalities for robotics and autonomous or semi-autonomous vehicle systems. The sensors provide complimentary information that, when combined, can provide rich datasets for informing control process of a robotic and autonomous or semi-autonomous vehicle system. For example, LiDAR point cloud data provides a very accurate range view, but with low resolution and texture information. Image data, such as RGB image data from a camera, on the other hand, has inherent depth ambiguity, but offers fine-grained texture and color information. The fusion of the two sets of data provides rich environment information.

Sensor fusion relies heavily of the accuracy of calibration information. The calibration information may define positional and temporal relationships between sensor data that each sensor generates. Current sensor fusion processes rely on predefined calibration information. However, these calibrations can be noisy, they may not be capable of accounting for synchronization issues between the generation the sensor data, and they may be static, such that when external factors affect an extrinsic or intrinsic property of the sensor causing it to operate outside of the predefined calibration, sensor fusion processes cannot actively adjust to the change in calibration information.

Accordingly, a need exists for techniques to address calibration based losses in sensor fusion processes.

SUMMARY

In some embodiments, a method includes receiving, with an electronic control unit, image data from a vision sensor and point cloud data from a depth sensor; and implementing, with the electronic control unit, a machine learning model trained to: align the point cloud data and the image data based on a current calibration, detect a difference in alignment of the point cloud data and the image data, adjust the current calibration based on the difference in alignment, and output a calibrated embedding feature map based on adjustments to the current calibration.

In some embodiments, a system includes a vision sensor for generating image data of an environment; a depth sensor for generating point cloud data of the environment; and an electronic control unit communicatively coupled to the vision sensor and the depth sensor. The electronic control unit configured to receive the image data from the vision sensor and the point cloud data from the depth sensor; and implement a machine learning model trained to: align the point cloud data and the image data based on a current calibration, detect a difference in alignment of the point cloud data and the image data, adjust the current calibration based on the difference in alignment, and output a calibrated embedding feature map based on adjustments to the current calibration.

In some embodiments, a vehicle includes a vision sensor for generating image data of an environment; a depth sensor for generating point cloud data of the environment; and an electronic control unit communicatively coupled to the vision sensor and the depth sensor. The electronic control unit configured to receive the image data from the vision sensor and the point cloud data from the depth sensor; and implement a machine learning model trained to: align the point cloud data and the image data based on a current calibration, detect a difference in alignment of the point cloud data and the image data, adjust the current calibration based on the difference in alignment, and output a calibrated embedding feature map based on adjustments to the current calibration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein relate to systems and methods providing a machine learning model trained to self-calibrate alignment between image sensor data and depth sensor data. More specifically, embodiments address problems that arise when fusing sensor data from different modalities. Sensor fusion enables systems, such as robotics and/or autonomous or semi-autonomous vehicle systems, to combine sensor data from various sensor modalities into rich datasets. However, to leverage the combination of sensor data from various sensor modalities, accurate fusion of the sensor data needs to be achieved. Initial calibration information that informs sensor fusion as to the alignment of the sensor data is generated offline and stored in a system for use. However, calibration information can be noisy, intrinsic and/or extrinsic features of a sensor or relationships between sensors may change during operation, or the calibration information may not be capable of accurately accounting for all operating conditions. For example, synchronization of shutters, exposure times, and/or data collection intervals between sensors may change leading to misalignments of the sensor data when the initial calibration information is utilized. Embodiments described herein address such issues by providing systems and methods that enable sensor fusion processes to include a self-calibration process based on machine learning models that can detect differences in alignment of sensor data and automatically correct misalignment between the data on-the-fly, for example, during operation of a system such as a robot or autonomous or semi-autonomous vehicle.

Processes for training the machine learning model and operation thereof will be described in detail herein. It should be understood that the machine learning model described herein may be one of a number of types of machine learning models although the description generally describes the machine learning model in the context of a neural network, for example a convolutional neural network. Additionally, the machine learning model of the present disclosure may be built into other task specific processes that implement sensor fusion. For example, the machine learning model may be a component of a point painting algorithm or an objection identification and/or segmentation process. These are only a few examples.

In some embodiments, a neural network may be trained to carry out point cloud decoration using vision features and then use the features to correct calibration online. For example, a 2D vision network may be trained specifically for feature decoration. The network may predict depth without LiDAR data, then to correct the predicted depth with perfect LiDAR depth to improve or correct calibration online. The network may predict depth using the vision point cloud or image data and obtain actual depth values from a LiDAR sensor that is fed into the network to shift the predicted depth. As a result, the network takes LiDAR reprojected points as input to adjust the local features that increase the alignment between the vision point cloud data and the LiDAR point cloud data. Other examples and implementations will be described herein.

Figure 1:
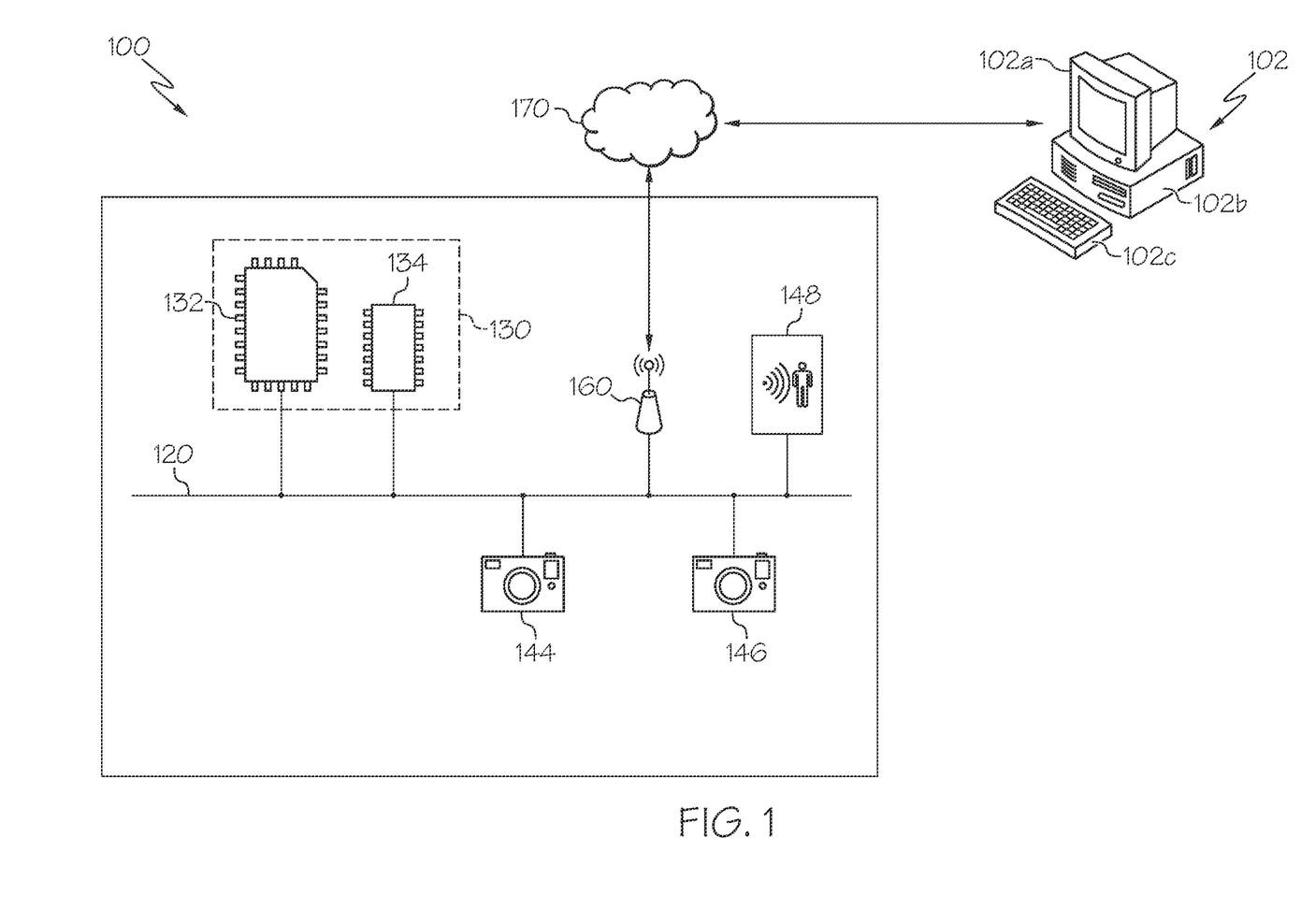
FIG. 1 schematically depicts components of a system for providing a machine learning model trained to self-calibrate alignment between image sensor data and depth sensor data according to one or more embodiments shown and described herein.
Figure 2:
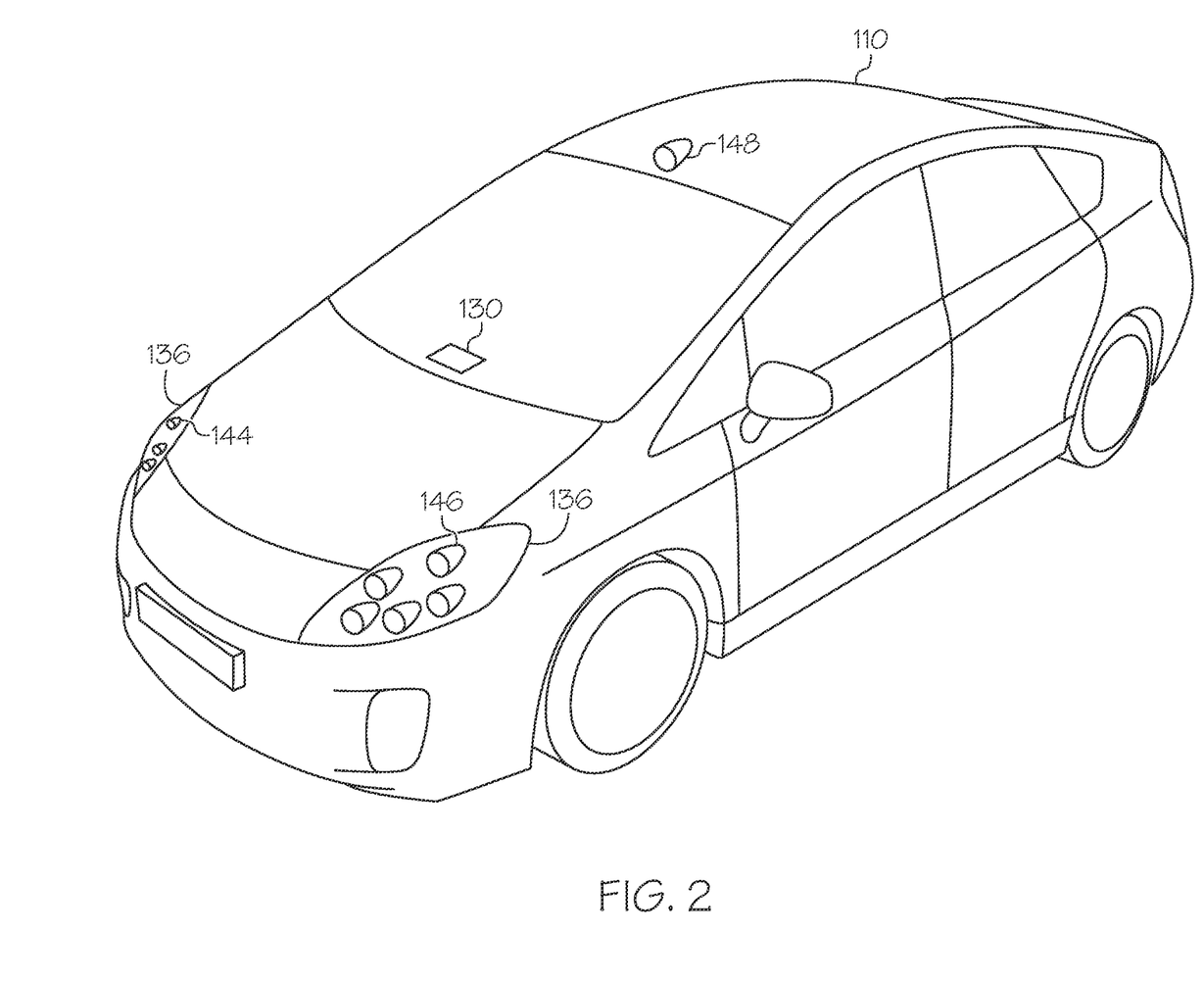
FIG. 2 depicts an illustrative environment and vehicle implementing a system providing a machine learning model trained to self-calibrate alignment between image sensor data and depth sensor data according to one or more embodiments shown and described herein.

Turning now to the drawings where like numbers refer to like structures, and first to FIGS. 1 and 2, FIG. 1 schematically depicts components of a system 100 providing a machine learning model to self-calibrate alignment between image sensor data (e.g., image data) and depth sensor data (e.g., point cloud data) during sensor fusion. FIG. 2 illustratively depicts an example implementation of the system 100 implemented by a vehicle 110. The embodiments described herein are directed to implementation of the system 100 in a vehicle 110, however, this is merely an example implementation as other electronic devices such as robots, aircraft, other transportation vehicles, security or monitoring systems, mapping systems, or the like may utilize the systems and methods described herein.

The system 100 may include, a communication path 120, an electronic control unit 130 having a processor 132 and a non-transitory computer readable memory 134, one or more vision sensors 144, 146 (also referred to herein as a first image sensor 144 and a second image sensor 146), one or more depth sensors 148 such as a RADAR system, a SONAR system, a LiDAR system or the like, and network interface hardware 160. The system 100 may be communicatively coupled to a network 170 by way of the network interface hardware 160. The components of the system 100 may be contained within or mounted to a vehicle 110 or other system such as a robot. The various components of the system 100 and the interaction thereof will be described in detail below.

The network 170 may operate to connect the system 100 with one or more computing devices 102. The computing device 102 may include a display 102a, a processing unit 102b and an input device 102c, each of which may be communicatively coupled to together and/or to the network 170. The computing device 102 may be utilized to configure the system 100 and/or provide information such as initial calibration information or supervisory control over the training of a machine learning model.

Referring to the system 100, the communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The electronic control unit 130 may also be referred to generally as a controller. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. Additionally, the functionality described herein may be implemented within a computer program product that when executed by a processor of a controller may cause the system to perform the functionality defined therein. While the embodiment depicted in FIG. 1 includes a single non-transitory computer readable memory 134, other embodiments may include more than one memory module.

Still referring to FIGS. 1 and 2, the one or more vision sensors 144, 146 are coupled to the communication path 120 and communicatively coupled to the electronic control unit 130 and consequently the processor 132 and non-transitory computer readable memory 134. Each of the one or more vision sensors 144, 146 may be a camera or any device having an array of sensing devices (e.g., pixels) capable of detecting radiation in an ultraviolet wavelength band, a visible light wavelength band, or an infrared wavelength band. Each of the one or more vision sensors 144, 146 may include or be associated with a night vision system or low light system. Each of the one or more vision sensors 144, 146 may have any resolution; however, high resolution may provide for enhanced light and object identification and detection. Each of the one or more vision sensors 144, 146 may be an omni-directional camera, or a panoramic camera. In some embodiments, one or more optical components, such as a mirror, fish-eye lens, or any other type of lens may be optically coupled to each of the one or more vision sensors 144, 146. Each of the one or more vision sensors 144, 146 may be positioned within or on the vehicle 110 to view the environment external to the vehicle 110. For example, without limitation, each of the one or more vision sensors 144, 146 may be positioned on the dashboard of the vehicle 110 or within the vehicle headlamp units 136 to capture images of the surroundings in front, alongside, behind, above, or below the vehicle 110 during operation. The position of each of the one or more vision sensors 144, 146 is not limited to the dashboard or the vehicle headlamp units 136 of the vehicle 110. Each of the one or more vision sensors 144, 146 may be positioned anywhere on or within the vehicle 110 to capture images of surroundings of the vehicle 110 during operation.

In vehicle implemented embodiments, the one or more vision sensors 144, 146 are implemented to capture images of the surroundings of the vehicle and generate image data that is communicated to the electronic control unit 130 and processor 132. During normal operation, the image data may be received by the processor 132, which process the image data using one or more image recognition, object recognition, and/or other image processing algorithms. The image data may be semantically labeled by pixel or groups of pixels. Any known or yet-to-be developed video or image recognition, object recognition, and/or other image processing algorithms may be implemented by the electronic control unit 130 to identify features within the image data and semantically label the same. Moreover, any known or yet-to-be-developed object recognition algorithms or facial rec-ognition algorithms may be used to extract the objects and features from the image data. Example object recognition algorithms or facial recognition algorithms include, but are not limited to, structure from motion ("SFM"), scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132. Additionally, the image data may be captured in a continuous succession at a predefined frame rate (e.g., frequency). In some embodiments, where more than one vision sensor is utilized to capture image data of the environment, the image data from each of the vision sensors 144, 146 may be stitched together to form a larger field-of-view image of the environment.

In some embodiments, the system 100 may include a depth sensor 148. The depth sensor 148 may be any sensor capable of determining distance values from the depth sensor 148 to an object or feature in an environment. The depth sensor 148 may be independent sensor device such as a RADAR system, a SONAR system, a LiDAR system or the like. The depth sensor 148 may also be configured with the one or more vision sensors 144, 146, where by IR image data or RGB-D image data captured by the one or more vision sensors 144, 146 may be utilized to determine distances (e.g., depths) within an environment.

Still referring to FIGS. 1 and 2, the system 100 includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe sensor fusion systems and methods implementing a machine learning model trained to self-calibrate alignment between image sensor data and depth sensor data. The sensor fusion systems and methods may be implemented by the aforementioned system 100 or may be integrated into other robotic and/or autonomous or semi-autonomous vehicle systems.

For example, a vehicle 110, such as an autonomous or semi-autonomous vehicle may have one or more vision sensors 144, 146 and one or more depth sensors 148. Vehicle systems may be configured to ingest sensor fusion data comprising depth data from the one or more depth sensors 148 and image data from the one or more vision sensors 144, 146. The fusion of depth data and image data appends image data with, for example, pixel level depth information giving 2D features depth information. In some embodiments, a machine learning model may be configured to predict depth from image data. Fusion of the depth data with the image data enables predicted depth information to be corrected or updated based on the depth data from the depth sensor 148. In some embodiments, depth data from the depth sensor may assist with training a machine learning model configured to learn predicted depths from image data.

Figure 3:
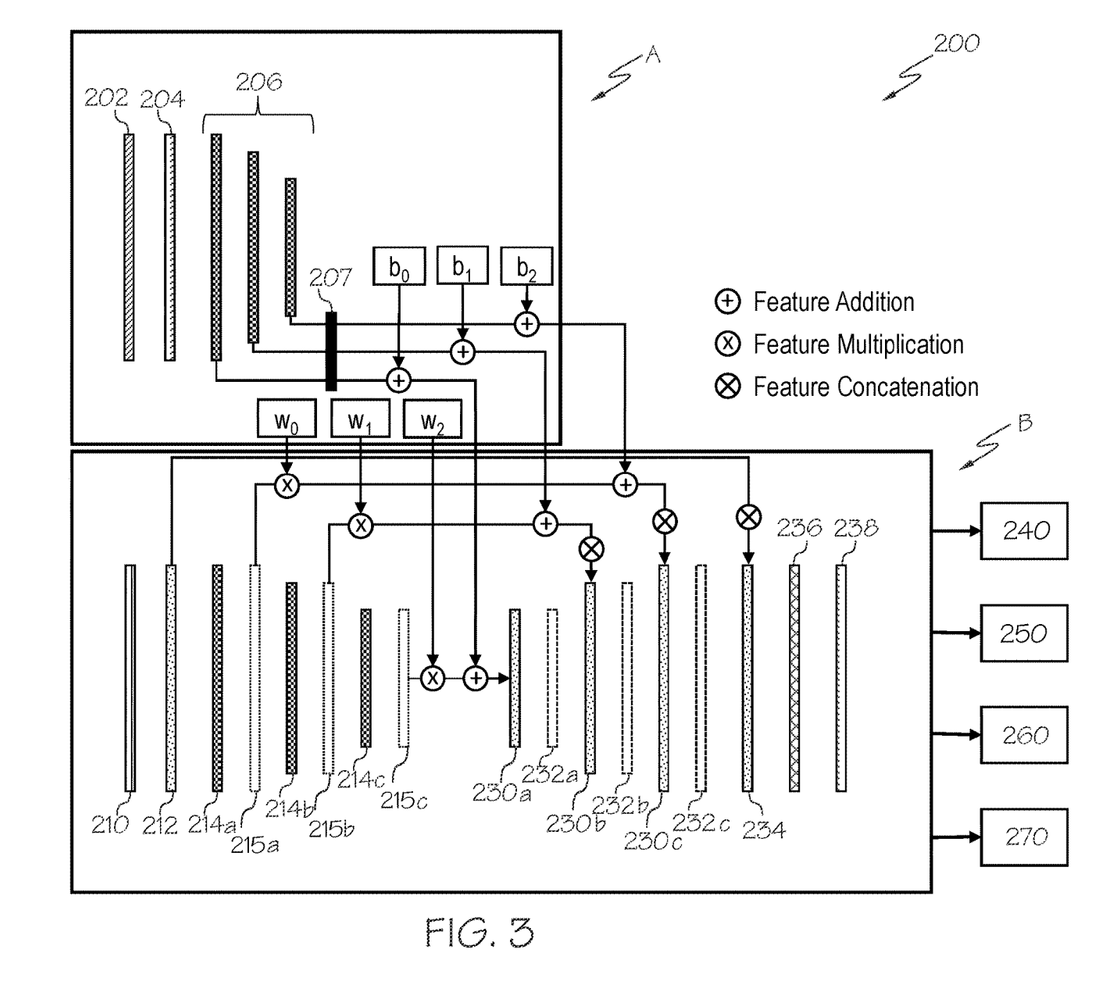
FIG. 3 depicts an illustrative diagram of a machine learning model trained to self-calibrate alignment between image sensor data and depth sensor data according to one or more embodiments shown and described herein.

Referring now to FIG. 3, an illustrative diagram of a machine learning model 200 trained to self-calibrate alignment between image sensor data and depth sensor data is depicted. As used herein, depth sensor data or depth data may be formatted as point cloud data. The diagram depicts illustrative layers of the machine learning model 200 and the interconnectivity therein. It should be understood that machine learning models may include many layers and are not limited to the particular structure or design depicted in FIG. 3. The machine learning model 200 may be a deep learning model such as a convolutional neural network or other type of machine learning model. For purposes of explanation, the machine learning model 200 will be described with as being implemented by a convolutional neural network. The machine learning model 200 includes two branches A, B. A first branch, A, ingests depth data 202, for example, generated by the depth sensors 148. A second branch, B, ingests image data 210, for example, generated by the one or more vision sensors 144, 146. The first branch inserts feature and depth information into the second branch so that, during training, the machine learning model 200 may learn to detect differences in the alignment of the depth data 202 and the image data 210. During training, artificial shifts in the alignment between the depth data 202 and the image data 210 may be implemented into either the depth data 202 or the image data 210 so that the machine learning model 200 may learn to detect the differences resulting from the shifts (e.g., translations or rotations of the sensor data). In operation, that is once the machine learning model 200 is trained, the machine learning model 200 may detect differences in the alignment (e.g., fusion) of the depth data 202 and the image data 210 and subsequently adjust the current calibration so that the misalignments are corrected.

Referring to the first branch, A, in some embodiments, the first branch includes a sparsification layer 204, a sparse residual block 206 having a set of residual layers, and a densification layer 207. The depth data 202 is received and ingested by the first branch. Each of the residual layers of the sparse residual block 206 may feed into the next residual layer and a correspondingly sized convolutional block 230A, 230B, 230C of the second branch. Outputs from the residual layers of the sparse residual block 206 to the second branch are processed through the densification layer 207. In some embodiments, weights $b_0$, $b_1$, $b_2$ are added (e.g., through a multiplication process) to features forwarded from the residual layers of the sparse residual block 206 to the second branch. The weights $b_0$, $b_1$, $b_2$ may be based on current calibration information and learnings of the model that adjust the current calibration information to new weights achieving self-calibration.

The second branch, B, includes a task network for fusing depth data 202 and/or features identified from the depth data 202 processed in the first branch with the image data 210 received from and generated by the one or more vision sensors 144, 146. The image data 210 is received and ingested by the second branch. The image data 210 proceeds through a plurality of layers including a convolutional block 212, and a series of residual blocks 214A, 214B, 214C alternatingly interspersed by packing blocks 215A, 215B, 215C. The packing blocks 215A, 215B, 215C feed forward to correspondingly sized convolutional blocks 230A, 230B, 230C. The feedforward signals from the packing blocks 215A, 215B, 215C may be multiplied by weighting signals $W_0$, $W_1$, $W_2$. The weighting signals $W_0$, $W_1$, $W_2$ may be based on current calibration information and learnings of the model that adjust the current calibration information to new weights for achieving self-calibration. Additionally, each of the convolutional blocks 230A, 230B, 230C are alternatingly interspersed by unpacking blocks 232A, 232B, 232C.

The residual layers of the sparse residual block 206 and the residual blocks 214A, 214B, 214C are configured to identify one or more features in the respective data they are configured to ingest. The feed forward signals from the packing blocks 215A, 215B, 215C are concatenated with the feature information from the residual layers of the sparse residual block 206. Accordingly, the convolutional blocks 230A, 230B, 230C incorporate fused data from the depth data and the image data. As the signals feed forward through the convolutional blocks 230A, 230B, 230C and the alternatingly interspersed unpacking blocks 232A, 232B, 232C, they culminate at an inverse depth layer 236. The inverse depth layer 236 may generate predicted depth values based on the image data 210 that are informed by actual depth data from the depth data 202 that is concatenated with the image data signals processed by the machine learning model 200. In some embodiments, the machine learning model 200 is trained to predicted depth values from the image data 210. The predicted depth values may be correlated with depth sensor values from the depth data. The machine learning model 200 may determine that one or more of the predicted depth values does not align with the depth sensor values from the depth data. As such, a realignment process of the depth data (e.g., point cloud data) and image data may be completed by making adjustments to the current calibration. Moreover, in some embodiments, once realignment is completed, the predicted depth values may be revised with depth values obtained from the point cloud data such that the machine learning model may further improve its prediction of depth values from image data.

The machine learning model 200 generates an aligned and fused sensor data 238. The aligned and fused sensor data 238 may be output as a calibrated embedding feature map 270. In embodiments, the machine learning model 200 is trained to detect differences in the alignment between the depth data and the image data, for example, based on identification of differences between feature boundaries and/or discontinuity of the feature embeddings. In response to detecting difference(s) in the alignment, adjustments may be made to the current calibration. Such adjustments may be manifested as adjustments to the weights $b_0$, $b_1$, $b_2$ and/or weighting signals $W_0$, $W_1$, $W_2$. As a results, the machine learning model 200 may generate and output a calibrated embedding feature map 270 that may be utilized by another task network such as an object identification, segmentation, and/or point painting process.

The particular output may vary depending on whether the machine learning model 200 is trained for a particular task such as 2D/3D semantic segmentation, 2D/3D object detection, or the like. Additionally, the machine learning model 200 may also generate and output several other signals. For example, the machine learning model 200 may generate and output a loss value 240 that compares the network predicted depth with the depth data from the depth sensor. The machine learning model 200 may generate and output a loss value 250 that compares the network feature prediction with labels annotated from the depth sensor data. As a further example, the machine learning model 200 may generate and output a loss value 260 that compares the 2D prediction with labels annotated from 2D images. The latter two examples may correspond to a machine learning model 200 that is configured to carry out the task of point painting. The loss values output by the machine learning model 200 may be utilized for training or updating the model.

Figure 4:
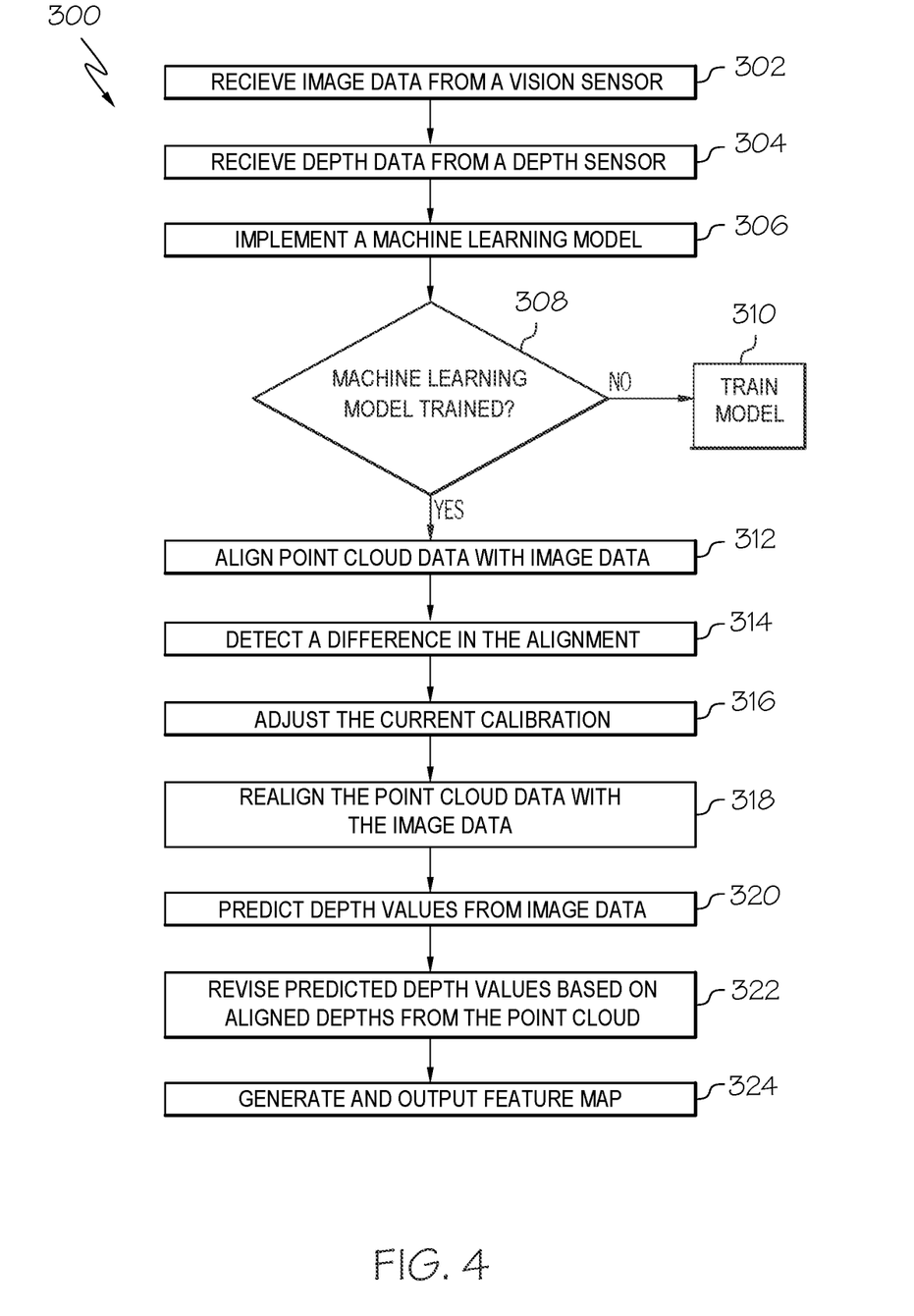
FIG. 4 depicts a flowchart of an example method for providing a machine learning model trained to self-calibrate alignment between image sensor data and depth sensor data according to one or more embodiments shown and described herein.

Referring now to FIG. 4, an illustrative flow diagram 300 of a method providing a machine learning model 200 to self-calibrate alignment between image sensor data and depth sensor data is depicted. The flow diagram 300 will be described with reference to FIGS. 1-3. It should be understood that the method depicted and described herein may be implemented by an electronic control unit 130 or another computing device 102. Additionally, processes associated with the blocks may be performed in different orders or omitted depending on implementation of the method within a particular system. That is, additional processes are included in the discussion that may not be necessary for implementation of a machine learning model to self-calibrate alignment between image sensor data and depth sensor data.

At block 302, an electronic control unit 130 may receive image data 210 generated by one or more vision sensors 144, 146. The image data 210 may be RGB image data or the like. At block 304, the electronic control unit 130 may receive depth data 202 generated by one or more depth sensors 148. The depth data 202 may be point cloud data, for example, generated by a LiDAR sensor system. In some embodiments, the electronic control unit 130 may also obtain a current calibration for fusion of the one or more vision sensors 144, 146 and the one or more depth sensors 148. The current calibration may define positional relationships between the sensors and/or include a set of values relating to shutter speeds, cycle times, exposure settings, and the like for each of the sensors. In some embodiments, the depth data 202 and the image data 210 may not be received directly from the sensors, but rather be stored in a memory component 134 and accessed at the time of processing.

At block 306, the electronic control unit 130 implements a machine learning model 200. The machine learning model 200 may be one of a variety of different type of machine learning models, for example, a convolutional neural network or the like. Implementation of a machine learning model 200 may include loading parameters for the machine learning model 200 and allocating computing resources to the operation of the machine learning model 200. Additionally, implementation of the machine learning model 200 includes operation of the machine learning model 200 and generation of outputs thereof. In embodiments, once a machine learning model 200 is implemented by the electronic control unit 130, a check may be performed to determine whether the machine learning model 200 is trained and ready for online operation or requires training and has been implemented for such activity at block 308. If the machine learning model 200 is determined to require training, "NO" at block 308, the method proceeds to block 310. However, if the machine learning model 200 is determined to be trained, "YES" at block 308, the method proceeds to block 312.

At block 310, a variety of training processes may be executed depending on the task the machine learning model 200 is desired to perform. For purposes of the present disclosure, training of the machine learning model 200 is directed to an example process for training the machine learning model 200 to self-calibrate misalignments in the process of fusing point cloud data with image data. One particular training method includes, providing, as inputs to the machine learning model 200, sets of depth data (e.g. in the form of point cloud data) and image data of the same environment. Artificial shifts in the alignment of the depth data or image data may be generated. Differences in the alignment of the depth data and image data may be annotated, for example painted into fusion of the misaligned depth data and image data. The machine learning model 200 may be assigned initial weights corresponding to a current calibration. As the machine learning model 200 iterates through the sets of depth data and corresponding image data, the painted misaligned fused data for each set of depth data and image data fed into the machine learning model 200 may act as a supervising guide to training the machine learning model 200 to detect differences in the fused data and subsequently adjust the current calibration so that the alignment is corrected. Training may be accomplished by utilizing corresponding features extracted from each of the depth data and the image data. Training may also be accomplished by learning to predict depth values in the image data and identifying corresponding actual depth values in the depth data to improve the calibration and alignment processes.

As noted above, if the machine learning model 200 is determined to be a trained model and ready for operation, the method proceeds at block 312. Blocks 312-324 relate to processes that the machine learning model 200 may be trained to execute. In some embodiments, the machine learning model 200 may not be trained to predict depth values from image data, but rather rely on feature extraction as the basis for self-calibrating the alignment of depth data with image data. At block 312, the machine learning model 200 is configured and/or trained to align depth data 202 with image data 210. The particular structure of the machine learning model 200 may include one or more layers that are linked together to fuse or concatenate signals from the depth data and the image data. The process of aligning the depth data 202 with the image data 210 is based on a current calibration. The current calibration information may be embedded within the model as weight signals influencing the signals from the depth data and the image data as they are fused together.

At block 314, the machine learning model 200 detects a difference in the alignment of the depth data and the image data. The machine learning model 200 may be trained to detect the difference or differences by a variety of methods. In one embodiment, the machine learning model 200 may be trained to identify differences in the continuity of lines and shapes between the two data sets. In another example, features extracted by the machine learning model 200 may be examined. For example, if boundaries of like features are not aligned then a difference may be detected by the machine learning model 200. In further embodiments, depth information may be compared. For example, the machine learning model 200 may determine whether predicted depth values generated from the image data 210 correspond with depth values from the depth data 202 generated by the one or more depth sensors 148. While the depth values may not exactly match between predicted depth values and depth values from the depth data, contours defined by each can be evaluated to determine whether alignment is accurate.

When the machine learning model 200 detects differences in the alignment between the fusion of the depth data 202 and the image data 210, the machine learning model 200 adjusts the current calibration values to correct the alignment at block 316. Adjustments to the current calibration may be manifested in changes to the weight signals $b_0$, $b_1$, $b_2$ and/or $W_0$, $W_1$, $W_2$. The adjusted calibration then becomes the current calibration for use during further iterations of sensor data fusion. At block 318, the machine learning model 200 realigns the depth data 202 and the image data 210 based on the adjusted calibration. Realigning the fused depth data 202 and the image data 210 enables depth information and other data captured by the one or more depth sensors to be appended into the image data 210, for example, at the pixel level rendering a rich dataset of the environment. As such, once realignment of the depth data 202 and image data 210 is complete, the machine learning model 200 may be configured to append or update appended data from the depth data 202 to the image data 210 generating a calibrated feature map 270, at block 324.

In some embodiments, at block 320, the machine learning model 200 may further be trained to predict depth values from the image data 210 as discussed above. The predicted depth values from the image data 210 may be compared with the depth values from the depth data 202. When the depth data 202 and the image data 210 are accurately aligned, the machine learning model 200 and/or the electronic control unit 130 may revise the predicted depth values with depth values obtained from the depth data (e.g., the point cloud data generated by the one or more depth sensors 148 such as a LiDAR sensor system) at block 322.

In further embodiments, the machine learning model 200 may generate and output a loss value 240 that compares the network predicted depth with the depth data 202 from the depth sensor 148. The machine learning model 200 may generate and output a loss value 250 that compares the network feature prediction with labels annotated from the depth data 202. As a further example, the machine learning model 200 may generate and output a loss value 260 that compares the 2D prediction with labels annotated from 2D images. The latter two examples may correspond to a machine learning model 200 that is configured to carry out the task of point painting.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Embodiments described herein provide systems and methods providing a machine learning model trained to self-calibrate alignment between image sensor data and depth sensor data. More specifically, embodiments address problems that arise when fusing sensor data from different modalities. In embodiments, a method includes receiving, with an electronic control unit, image data from a vision sensor and point cloud data from a depth sensor, implementing, with the electronic control unit, a machine learning model. The machine learning model is trained to align the point cloud data and the image data based on a current calibration, detect a difference in the alignment of the point cloud data and the image data, adjust the current calibration based on the detected difference in alignment, and output a calibrated embedding feature map based on adjustments to the current calibration. In some embodiments, the machine learning model is further trained to extract a first feature from the point cloud data, extract a second feature from the image data, and detection of the difference in the alignment of the point cloud data and the image data is based on differences between alignment of the first feature and the second feature. The misalignment between the point cloud data and the image data may be determined by identifying differences between a boundary of the first feature and a boundary of the second feature.

In some embodiments, the machine learning model is further trained to predict depth values from the image data, realign the point cloud data and the image data based on adjustments to the current calibration, and revise the predicted depth values with depth values obtained from the point cloud data.

As described herein in more detail, the machine learning model may include a first branch having a first set of layers configured to receive the point cloud data and extract one or more first features from the point cloud data, a second branch having a second set of layers configured to receive the image and extract one or more second features from the image data, and the one or more first features generated by the first set of layers are projected into the second set of layers.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving, with an electronic control unit, image data from a vision sensor and point cloud data from a depth sensor; and
implementing, with the electronic control unit, a machine learning model comprising:
a first branch having a first set of layers and a first set of weights associated with respective outputs of the first set of layers;
a second branch having a second set of layers and a second set of weights associated with respective outputs of the second set of layers, wherein the machine learning model is trained to:
align the point cloud data and the image data based on a current calibration, wherein the current calibration defines respective values for the first set of weights and the second set of weights,
detect a difference in alignment of the point cloud data and the image data,
adjust the current calibration based on the difference in the alignment, wherein to adjust the current calibration, one or more of the respective values for the first set of weights and the second set of weights is changed to a different value, and
output a calibrated embedding feature map based on adjustments to the current calibration.

2. The method of claim 1, wherein the machine learning model is further trained to:
extract a first feature from the point cloud data,
extract a second feature from the image data, and
detect the difference in the alignment of the point cloud data and the image data based on differences between alignment of the first feature and the second feature.

3. The method of claim 2, wherein the machine learning model is further trained to identify a misalignment between a boundary of the first feature and a boundary of the second feature.

4. The method of claim 1, wherein the machine learning model is further trained to:
predict depth values from the image data,
realign the point cloud data and the image data based on adjustments to the current calibration, and
revise the predicted depth values with depth values obtained from the point cloud data.

5. The method of claim 1, wherein:
the first branch having the first set of layers is configured to receive the point cloud data and extract one or more first features from the point cloud data,
the second branch having the second set of layers is configured to receive the image data and extract one or more second features from the image data, and
the one or more first features generated by the first set of layers are projected into the second set of layers.

6. The method of claim 1, wherein the vision sensor is an RGB camera.

7. The method of claim 1, wherein the depth sensor is at least one of a LiDAR sensor, a radar sensor, or a sonar sensor.

8. The method of claim 1, further comprising:
training the machine learning model, wherein training comprises artificially shifting the point cloud data or the image data such that the machine learning model learns to detect differences in alignment of the point cloud data and the image data.

9. A system comprising:
a vision sensor for generating image data of an environment;
a depth sensor for generating point cloud data of the environment; and
an electronic control unit communicatively coupled to the vision sensor and the depth sensor, the electronic control unit configured to:
receive the image data from the vision sensor and the point cloud data from the depth sensor; and
implement a machine learning model comprising:
a first branch having a first set of layers and a first set of weights associated with respective outputs of the first set of layers;
a second branch having a second set of layers and a second set of weights associated with respective outputs of the second set of layers, wherein the machine learning model is trained to:
align the point cloud data and the image data based on a current calibration, wherein the current calibration defines respective values for the first set of weights and the second set of weights,
detect a difference in alignment of the point cloud data and the image data,
adjust the current calibration based on the difference in the alignment, wherein to adjust the current calibration, one or more of the respective values for the first set of weights and the second set of weights is changed to a difference value, and
output a calibrated embedding feature map based on adjustments to the current calibration.

10. The system of claim 9, wherein the machine learning model is further trained to:
extract a first feature from the point cloud data,
extract a second feature from the image data, and
detect the difference in the alignment of the point cloud data and the image data based on differences between alignment of the first feature and the second feature.

11. The system of claim 10, wherein the machine learning model is further trained to identify a misalignment between a boundary of the first feature and a boundary of the second feature.

12. The system of claim 9, wherein the machine learning model is further trained to:
predict depth values from the image data,
realign the point cloud data and the image data based on adjustments to the current calibration, and
revise the predicted depth values with depth values obtained from the point cloud data.

13. The system of claim 9, wherein:
the first branch having the first set of layers is configured to receive the point cloud data and extract one or more first features from the point cloud data,
the second branch having the second set of layers is configured to receive the image data and extract one or more second features from the image data, and
the one or more first features generated by the first set of layers are projected into the second set of layers.

14. The system of claim 9, wherein the vision sensor is an RGB camera.

15. The system of claim 9, wherein the depth sensor is at least one of a LIDAR sensor, a radar sensor, or a sonar sensor.

16. The system of claim 9, wherein the electronic control unit is further configured to:
train the machine learning model, wherein training comprises artificially shifting the point cloud data or the image data such that the machine learning model learns to detect differences in alignment of the point cloud data and the image data.

17. A vehicle comprising:
a vision sensor for generating image data of an environment;
a depth sensor for generating point cloud data of the environment; and
an electronic control unit communicatively coupled to the vision sensor and the depth sensor, the electronic control unit configured to:
receive the image data from the vision sensor and the point cloud data from the depth sensor; and
implement a machine learning model comprising:
a first branch having a first set of layers and a first set of weights associated with respective outputs of the first set of layers;
a second branch having a second set of layers and a second set of weights associated with respective outputs of the second set of layers, wherein the machine learning model is trained to:
align the point cloud data and the image data based on a current calibration, wherein the current calibration defines respective values for the first set of weights and the second set of weights,
detect a difference in alignment of the point cloud data and the image data,
adjust the current calibration based on the difference in the alignment, wherein to adjust the current calibration, one or more of the respective values for the first set of weights and the second set of weights is changed to a difference value, and
output a calibrated embedding feature map based on adjustments to the current calibration.

18. The vehicle of claim 17, wherein the machine learning model is further trained to:
extract a first feature from the point cloud data,
extract a second feature from the image data, and
detect the difference in the alignment of the point cloud data and the image data based on differences between alignment of the first feature and the second feature.

19. The vehicle of claim 17, wherein the machine learning model is further trained to:
predict depth values from the image data,
realign the point cloud data and the image data based on adjustments to the current calibration, and
revise the predicted depth values with depth values obtained from the point cloud data.

20. The vehicle of claim 17, wherein the machine learning model comprises:
the first branch having the first set of layers is configured to receive the point cloud data and extract one or more first features from the point cloud data,
the second branch having the second set of layers is configured to receive the image data and extract one or more second features from the image data, and
the one or more first features generated by the first set of layers are projected into the second set of layers.

* * * * *